(12) United States Patent
Ikeda

(10) Patent No.: US 10,005,430 B2
(45) Date of Patent: Jun. 26, 2018

(54) WIPER APPARATUS

(71) Applicant: Mitsuba Corporation, Gunma (JP)

(72) Inventor: Takeshi Ikeda, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days. days.

(21) Appl. No.: 15/320,365

(22) PCT Filed: May 11, 2015

(86) PCT No.: PCT/JP2015/063434
§ 371 (c)(1),
(2) Date: Dec. 20, 2016

(87) PCT Pub. No.: WO2015/198723
PCT Pub. Date: Dec. 30, 2015

(65) Prior Publication Data
US 2017/0158172 A1 Jun. 8, 2017

(30) Foreign Application Priority Data
Jun. 24, 2014 (JP) .................................. 2014-128959

(51) Int. Cl.
*B60S 1/08* (2006.01)
*B60S 1/28* (2006.01)
(Continued)

(52) U.S. Cl.
CPC ............... *B60S 1/0896* (2013.01); *B60S 1/28* (2013.01); *B60S 1/04* (2013.01); *B60S 1/06* (2013.01); *B60S 1/08* (2013.01)

(58) Field of Classification Search
CPC ............ B60S 1/08; B60S 1/0896; B60S 1/04
(Continued)

(56) References Cited

U.S. PATENT DOCUMENTS 4,559,484 A * 12/1985 Hirano .................. B60S 1/08
15/250.17
4,904,908 A * 2/1990 Buschur ................. B60S 1/08
15/250.17
(Continued)

FOREIGN PATENT DOCUMENTS

FR 2 714 641 A1 7/1995
JP S58-20546 A 2/1983
(Continued)

OTHER PUBLICATIONS

International Search Report for PCT/JP2015/063434 dated May 28, 2015.

*Primary Examiner* — Michael Jennings
(74) *Attorney, Agent, or Firm* — McCormick, Paulding & Huber LLP

(57) ABSTRACT

When the number of times of vehicle speed detections reaches a prescribed times "n", a DR-side wiper blade is moved in such a way that when the front end side of a lip reaches a lower-side stop position APS1, the DR-side wiper blade is temporarily moved to a lower limit position for stop EPSL, then moved to an upper-side stop position APS2 and stopped there, and in such a way that when the front end side of the lip reaches an upper-side stop position APS2, the DR-side wiper blade is moved temporarily to an upper limit position for stop EPSU, then moved to the lower-side stop position APS1 and stopped there.

4 Claims, 11 Drawing Sheets

(51) Int. Cl.
*B60S 1/04* (2006.01)
*B60S 1/06* (2006.01)

(58) Field of Classification Search
USPC .......................... 15/250.17, 250.3; 318/280
See application file for complete search history.

(56) References Cited

U.S. PATENT DOCUMENTS

| | | | | |
|---|---|---|---|---|
| 5,860,185 | A * | 1/1999 | Ponziani | B60S 1/08 15/250.13 |
| 6,306,220 | B1 * | 10/2001 | Zimmer | B60S 1/04 134/6 |
| 9,031,390 | B2 * | 5/2015 | Natsume | H02P 7/29 318/266 |
| 2010/0139025 | A1 * | 6/2010 | Natsume | B60S 1/0896 15/250.31 |
| 2013/0207577 | A1 * | 8/2013 | Natsume | B60S 1/0896 318/286 |

FOREIGN PATENT DOCUMENTS

| | | |
|---|---|---|
| JP | S58-78848 A | 5/1983 |
| JP | S60-67241 A | 4/1985 |
| JP | H05-37616 U | 5/1993 |
| JP | H06-344867 A | 12/1994 |
| JP | H07-9948 A | 1/1995 |
| JP | 2001-512070 A | 8/2000 |
| JP | 2000-516558 A | 12/2000 |
| JP | 2010-159044 A | 7/2010 |
| JP | 2013-163454 A | 8/2013 |

* cited by examiner

WIPER APPARATUS

CROSS REFERENCE TO RELATED APPLICATION

Applicant hereby claims foreign priority benefits under U.S.C. § 119 from International Patent Application Serial No. PCT/JP2015/063434 filed on May 11, 2015 and Japanese Patent Application No. 2014-128959 filed on Jun. 24, 2014, the contents of all of which are incorporated by reference herein.

TECHNICAL FIELD

The present invention relates to a wiper apparatus which changes a direction of a front end side of a lip of a wiper blade on the basis of each stop of the wiper blade.

BACKGROUND ART

Conventionally, a vehicle such as automotive vehicle is equipped with a wiper apparatus which ensures a field of view from a driver and an occupant through a windshield. A motor device having an output shaft to be rotated in normal and reverse directions is used as a driving source for such a wiper apparatus. This motor device causes a wiper member to oscillate in a given wiping range and wipe rainwater, etc., away from the windshield.

The wiper member includes a wiper arm attached to a vehicle body in such a way as to oscillate freely, and a wiper blade fitted to the front end side of the wiper arm. The wiper blade has a blade rubber whose lip is pressed to the surface by the spring force of a tensile spring disposed on the base end of the wiper arm. This prevents the blade rubber from lifting apart from the surface under the influence of wind, etc., caused by the vehicle's traveling, thereby ensuring better wiping performance.

On the other hand, the spring force of the tensile spring keeps the lip tilted when the wiper blade is in a stopped state. If the wiper blade is not used for a long period, therefore, the blade rubber deforms plastically, posing a problem that the wiping performance of the blade rubber drops significantly. In order to solve the above problem, for example, Japanese Patent Application Laid-Open Publication No. 2013-163454 discloses a technique which periodically changes a direction of the front end side of the lip to suppress the plastic deformation of the blade rubber.

A technique disclosed in Japanese Patent Application Laid-Open Publication No. 2013-163454 includes a control unit (controller) which controls an output shaft of a wiper motor to cause the output shaft to rotate in normal and reverse directions. When an ignition switch is switched on or off, the control unit moves the wiper blade between a first stop position and a second stop position in each case. This causes the front end side of the lip to change the direction it faces, thus suppressing the plastic deformation of the blade rubber.

SUMMARY

When the first stop position and the second stop position are close to each other, a distance that the wiper blade travels to change the direction the front end side of the lip faces is short. In a case where the blade rubber gets stiff due to its service in a cold region, etc., such a short travel distance may make it impossible for the front end side of the lip to change the direction it faces. In such a case, the plastic deformation of the blade rubber intensifies, creating such a problem that the wiping performance of the blade rubber drops significantly.

An object of the present invention is to provide a wiper apparatus which does not frequently change a direction of the front end side of a lip, and that can certainly change the direction of the front end side of the lip at a predetermined stop position.

In accordance with one aspect of the present invention, there is provided a wiper apparatus which changes a direction of a front end side of a lip of a wiper blade on the basis of each stop of the wiper blade, wherein the lip comes in sliding contact with a windshield on which positions are specified, the specified positions including: a first stop position at which the wiper blade is stopped with the front end side of the lip put in a position of facing an upper side of the windshield; a second stop position at which the wiper blade is stopped with the front end side of the lip put in a position of facing a lower side of the windshield; a lower limit position for stop serving as a lower limit position to a stop action of the wiper blade; and an upper limit position for stop serving as an upper limit position to a stop action of the wiper blade, and wherein when the number of times of vehicle speed detections reaches a prescribed times, the wiper blade is moved in such a way that when the front end side of the lip reaches the first stop position, the wiper blade is moved temporarily to the lower limit position for stop, then moved to the second stop position and then stopped, and in such a way that when the front end side of the lip reaches the second stop position, the wiper blade is moved temporarily to the upper limit position for stop, then moved to the first stop position and stopped there.

In the wiper apparatus according to further aspect of the present invention, the first stop position is provided on a lower side of the windshield, the second stop position is provided on an upper side of the windshield and is above the first stop position, the lower limit position for stop is provide on a further lower side of the windshield, the further lower side being below the first stop position, and the upper limit position for stop is provide on a further upper side of the windshield, the further upper side being above the second stop position.

In accordance with still further aspect of the present invention, there is provided a wiper apparatus which change a direction of a front end side of a lip of a wiper blade on the basis of each stop of the wiper blade, wherein on a surface with which the lip comes in sliding contact, positions are specified, the specified positions including: a first stop position at which the wiper blade is stopped with the front end side of the lip put in a position of facing an upper side of the windshield; a second stop position at which the wiper blade is stopped with the front end side of the lip put in a position of facing a lower side of the windshield; a lower limit position for stop provided on a further lower side of the windshield to be below the first stop position, the lower limit position for stop serving as a lower limit position to a stop action of the wiper blade; and a third stop position provided between the first stop position and the lower limit position for stop, the third stop position being a position at which the wiper blade is stopped with the front end side of the lip put in a position of facing the upper side of the windshield, wherein when the number of times of vehicle speed detections reaches a prescribed times, the wiper blade is moved in such a way that when the front end side of the lip reaches the first stop position or third stop position, the wiper blade is moved temporarily to the lower limit position for stop, then moved to the second stop position, and then stopped there, and in such a way that when the front end side of the lip reaches the second stop position, the wiper blade is moved to the third stop position and stopped there.

In the wiper apparatus according to yet further aspect of the present invention, the first stop position is provided on a lower side of the windshield, and the second stop position is provided on an upper side of the windshield and is therefore above the first stop position.

According to the present invention, when the number of times of vehicle speed detection reaches a predetermined number of times, the wiper blade is moved in such a way that when the front end side of the lip reaches the first stop position, the wiper blade is temporarily moved to the lower limit position for stop, then moved to the second stop position and stopped there, and in such a way that when the front end side of the lip reaches the second stop position, the wiper blade is temporarily moved to the upper limit position for stop, then moved to the first stop position and stopped there.

Therefore, this process prevents a problem caused by a bending propensity developing at the lip, such as a stop position shifted from the correct stop position, and eliminates the need of frequently changing the direction the front end side of the lip faces every time the ignition switch is on or off.

According to the present invention, the travel distance of the wiper blade is increased as the wiper blade is caused to stop at each of the first stop position and the second stop position. At each stop position, it is possible to certainly change the direction of the front end side of the lip.

DETAILED DESCRIPTION

Hereinafter, the first embodiment of the present invention will be described in detail with reference to the drawings.

Figure 1:
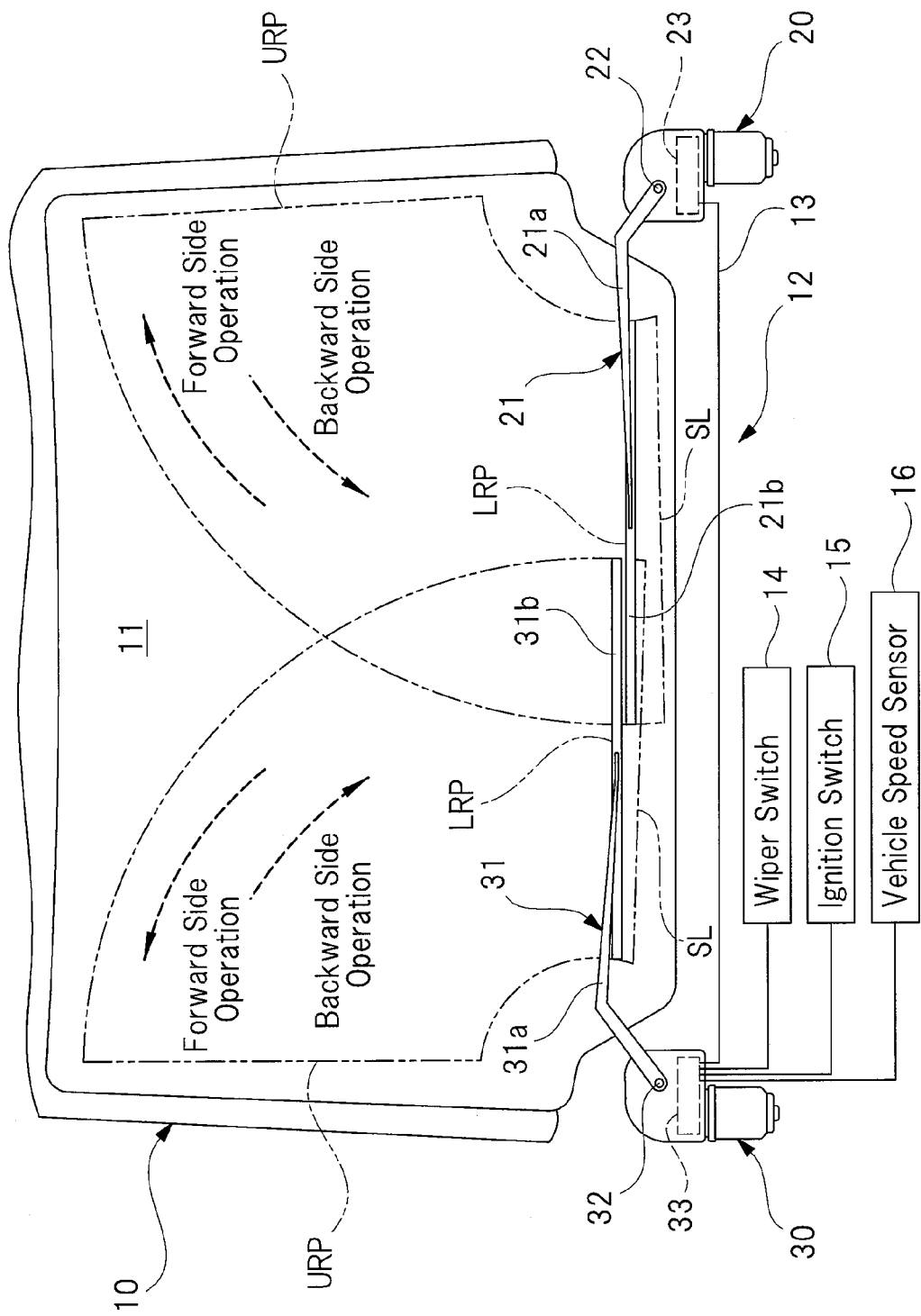
FIG. 1 is a view showing an application example of a wiper apparatus to a vehicle.
Figure 2:
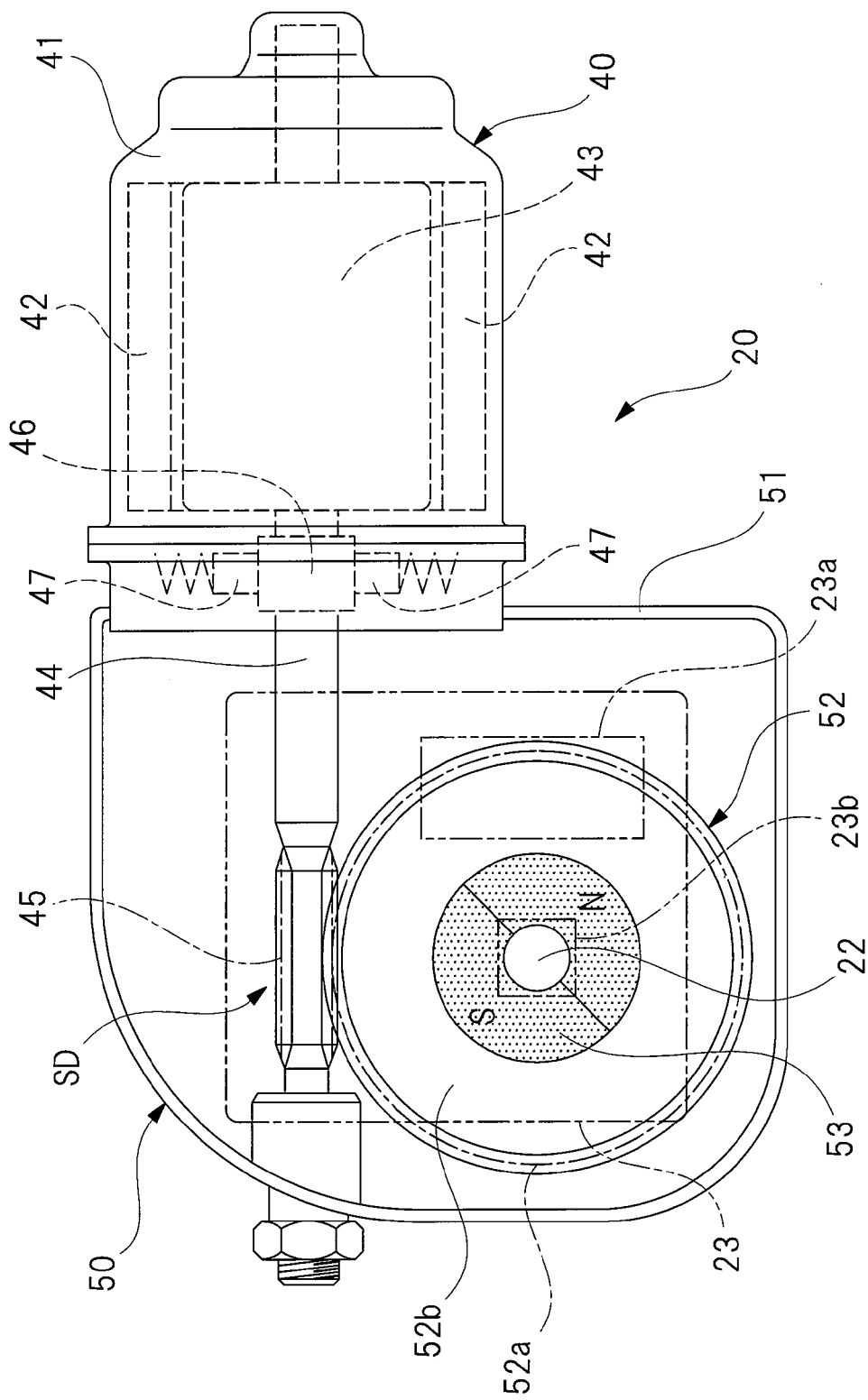
FIG. 2 is a view showing details of a wiper motor.
Figure 3:
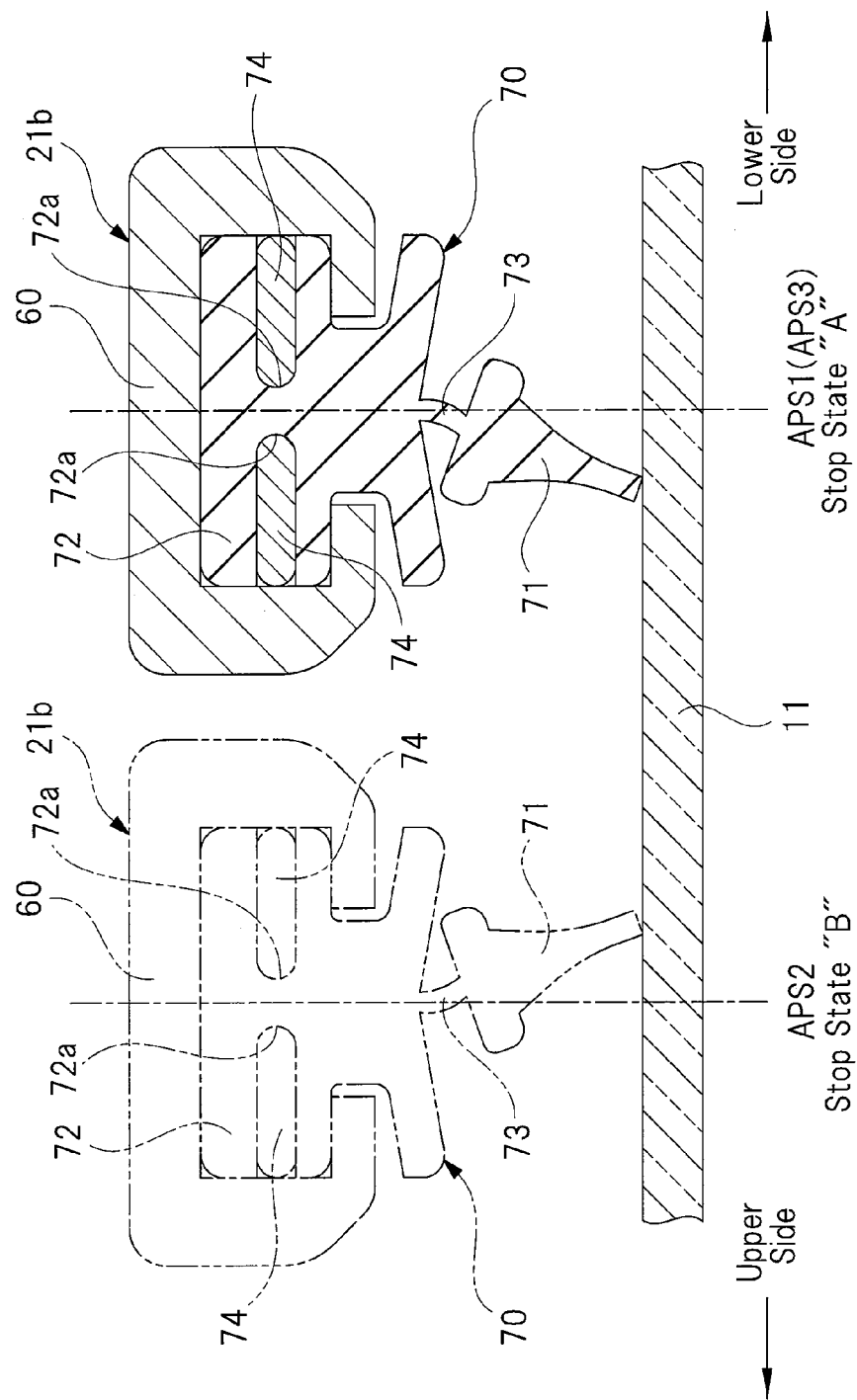
FIG. 3 is a view explaining stop states "A" and "B" of a wiper blade.
Figure 4:
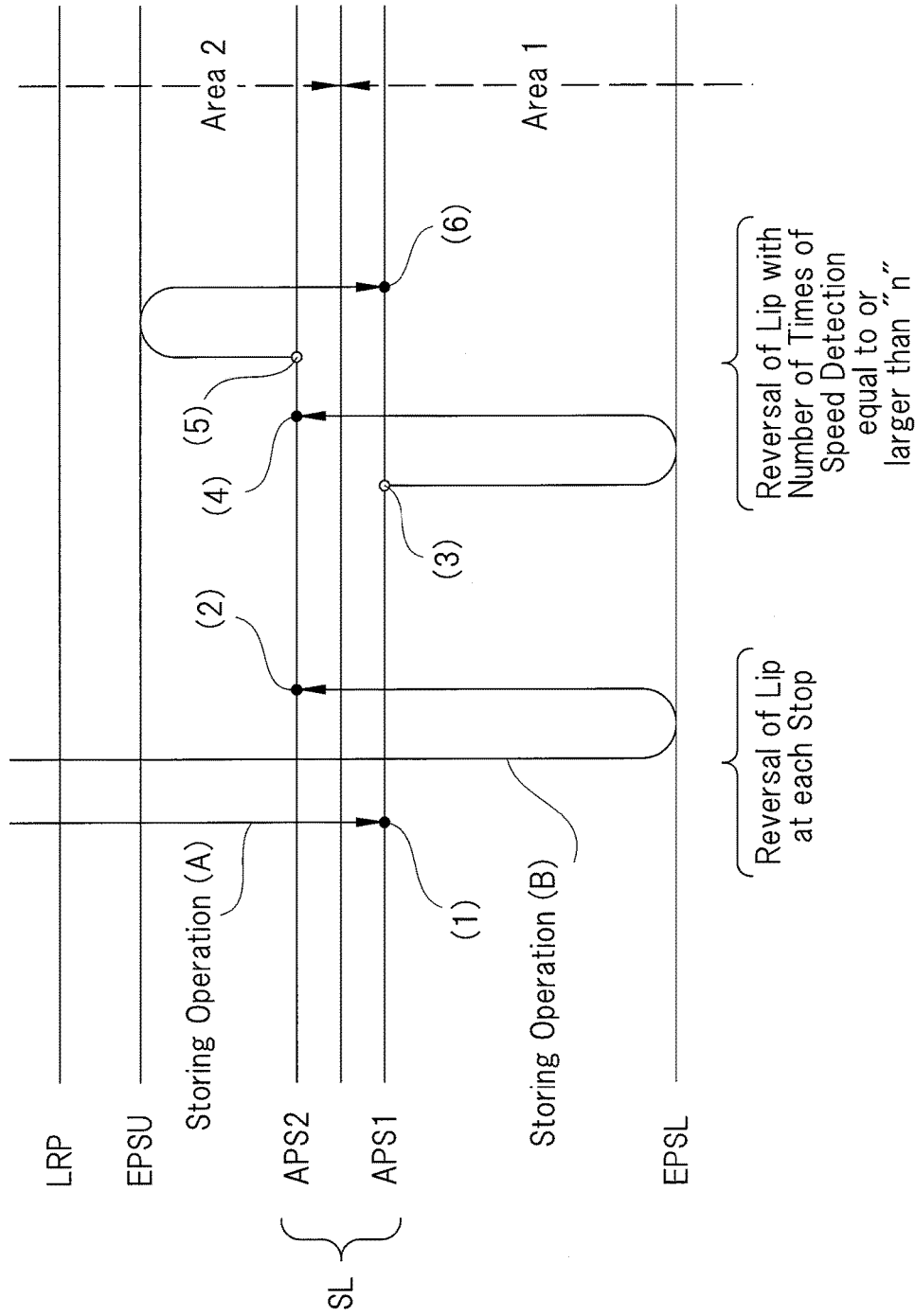
FIG. 4 is a diagram explaining a lip turning back operation in the first embodiment.
Figure 5:
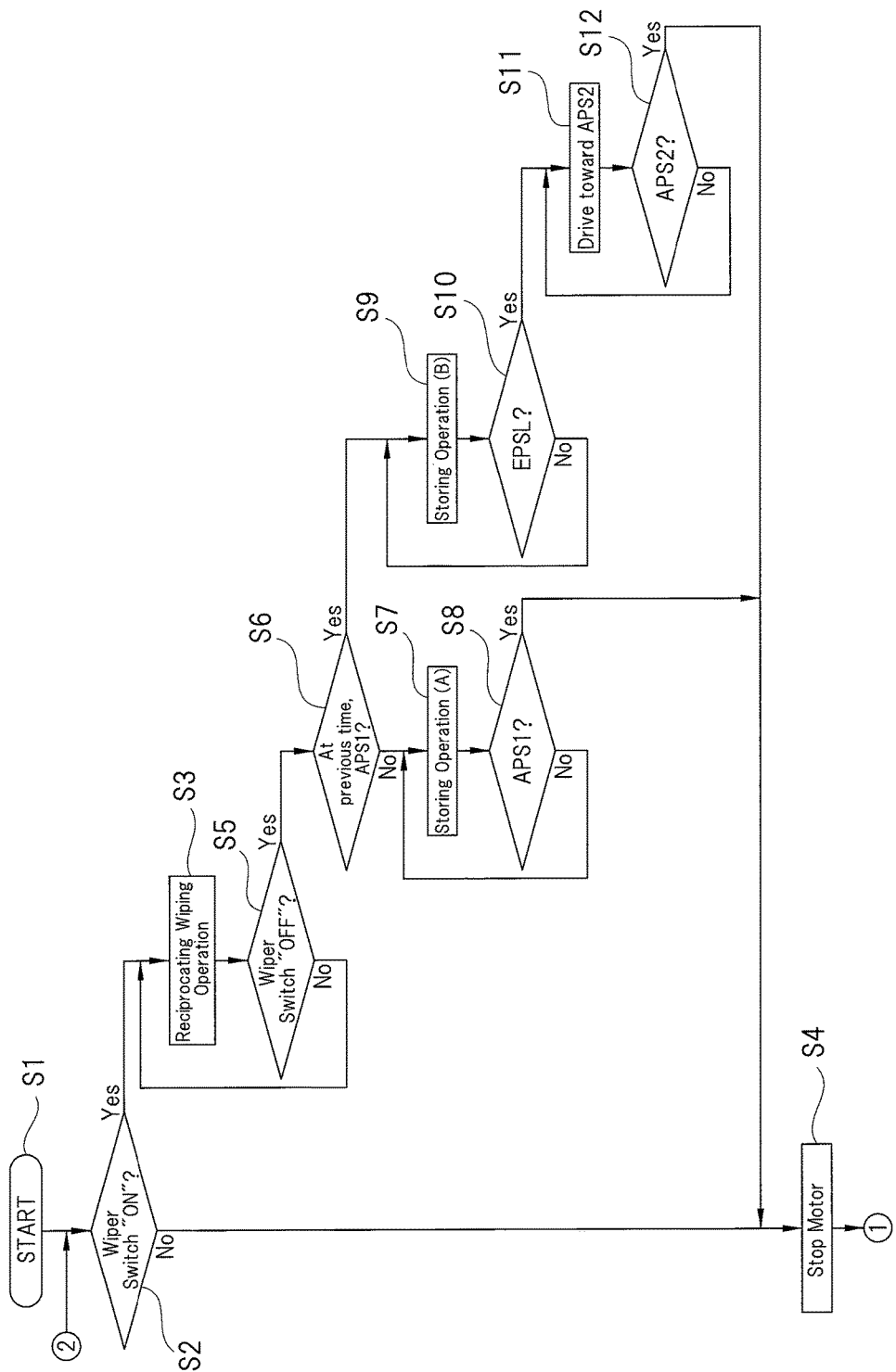
FIG. 5 is a flow chart explaining the lip turning back operation shown FIG. 4 (in each stop state of the wiper blade)
Figure 6:
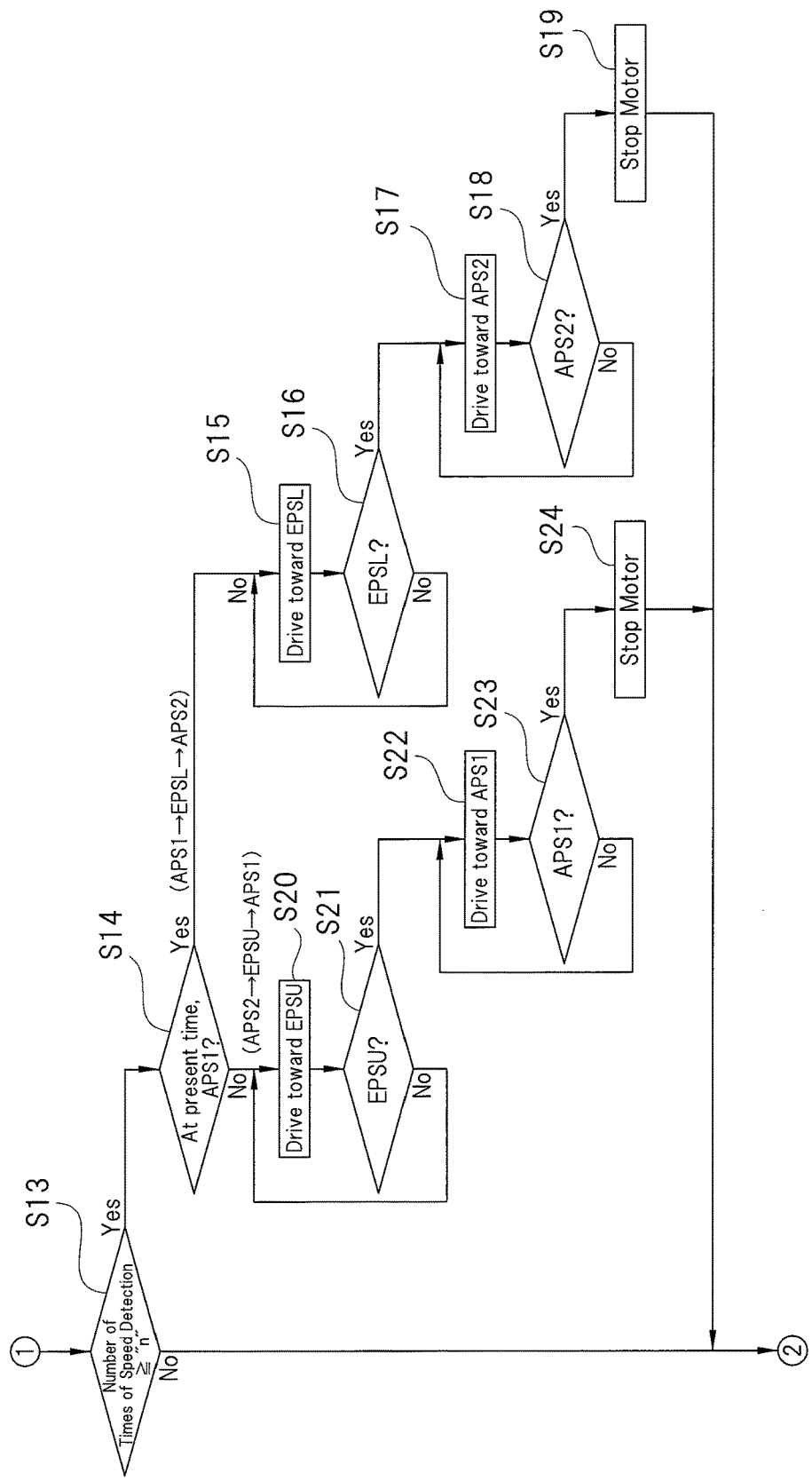
FIG. 6 is a flow chart explaining the lip turning back operation shown in FIG. 4 (the number of times of speed detection)

FIG. 1 is a view showing an application example of a wiper apparatus to a vehicle, FIG. 2 is a view showing details of a wiper motor, FIG. 3 is a view explaining stop states "A" and "B" of a wiper blade, FIG. 4 is a diagram explaining a turning back operation of a lip in the first embodiment, FIG. 5 is a flow chart explaining the lip turning back operation shown FIG. 4 (in each stop state of the wiper blade), and FIG. 6 is a flow chart explaining the lip turning back operation shown in FIG. 4 (the number of times of speed detection).

As shown in FIG. 1, a vehicle 10, such as automotive vehicle, has a windshield 11 disposed on the front side of the vehicle 10. A wiper apparatus 12 is disposed under the windshield 11, and adapted to wipe away rainwater, etc., from the windshield 11 to ensure a field of view from a driver and an occupant through the windshield 11. The wiper apparatus 12 includes a DR-side wiper motor 20 disposed on the DR-side (driver's seat side) of the vehicle 10 and an AS-side wiper motor 30 disposed on the AS-side (assistant driver's seat side) of the vehicle 10. These wiper motors 20 and 30 are the same in constitution as each other, and oppositely arranged on the left-hand side and right-hand side of the vehicle 10.

The wiper motor 20 includes a DR-side wiper member 21, while the wiper motor 30 includes an AS-side wiper member 31. The DR-side wiper member 21 has a DR-side wiper arm 21a and a DR-side wiper blade 21b, while the AS-side wiper member 31 has an AS-side wiper arm 31a and an AS-side wiper blade 31b. The wiper arms 21a and 31a have respective base ends fixed to output shafts 22 and 32 of the wiper motors 20 and 30. The wiper motors 20 and 30 directly swing the wiper members 21 and 31 without using a link mechanism or the like. In other words, the wiper apparatus 12 is structured as a symmetrical-type direct-drive wiper apparatus.

Each of the wiper blades 21b and 31b is caused to perform a wiping operation within a fan-shaped wiping range with a central angle of about 90 degrees, the wiping range being defined between a lower reverse-turn position LRP and an upper reverse-turn position URP. The wiper motors 20 and 30 detect the rotation positions of the output shafts 22 and 33, and on the basis of the detected rotation positions, cause the wiper blades 21b and 31b to turn in reverse directions at the lower reverse-turn position LRP and upper reverse-turn position URP. A storage location SL is formed on a part of windshield 11 which is lower than the lower reverse-turn position LRP. This storage location SL indicates a stop position to which the wiper blades 21b and 31b are moved when the wiper apparatus 12 is stopped by switching off a wiper switch 14.

A DR-side control board 23 and an AS-side control board 33 are respectively housed in the wiper motor 20 and the wiper motor 30. A communication line 13 is provided between the control board 23 and the control board 33, and the wiper motor 20 and the wiper motor 30 communicate with each other via the communication line 13. The wiper motors 20 and 30 communicate information of the rotation positions of the output shafts 22 and 32 (information of the positions of the wiper blades 21b and 31b) to each other via the communication line 13, thereby causing the wiper blades 21b and 31b to perform a wiping operation without colliding against each other on the windshield 11.

The AS-side control board 33 is connected to the wiper switch 14 disposed in the vehicle interior (not shown). By operating the wiper switch 14, the wiper motors 20 and 30 are selectively rotated at high speed, at low speed, or intermittently. The AS-side control board 33 is connected to an ignition switch 15 disposed in the vehicle interior. By operating the ignition switch 15, the wiper apparatus 12 can perform the wiping operation via the wiper switch 14. The AS-side control board 33 is connected to a vehicle speed sensor 16, and adapted to detect the speed ("V"[km/h]) of the vehicle 10. Information from the vehicle speed sensor 16 is used as information which triggers a lip turning back operation which will be described later. In this manner, information of rotation positions of the output shafts 22 and 32 and information of rotation speeds of the wiper motors 20 and 30 are transmitted to the control boards via the communication line 13.

The DR-side wiper motor 20 and the AS-side wiper motor 30 are formed to be the same in configuration as each other. For this reason, the structure of the DR-side wiper motor 20, which represents both wiper motors, will be then explained in detail in the following description in which description of the AS-side wiper motor 30 will be omitted.

As shown in FIG. 2, the DR-side wiper motor 20 includes a motor unit 40 and a gear unit 50 connected thereto. The motor unit 40 has a bottomed cylindrical yoke 41 formed by press working a steel plate made of magnetic material. Inside the yoke 41, a plurality of permanent magnets 42 are arranged. Inside the permanent magnets 42, an armature 43 is set rotatably across a given (air) gap between the permanent magnets 42 and the armature 43, and is wounded with a coil (not shown) whose winding is turned given number of times by a given winding method.

At the rotation center of the armature 43, an armature shaft 44 penetrating the armature 43 is fixed. The base end side of the armature shaft 44 (shown on the right-hand side in FIG. 2) is supported rotatably on the bottom of the yoke 41 via a radial bearing (not shown). The front end side of the armature shaft 44 (shown on the left-hand side in FIG. 2) extends into a case 51 of the gear unit 50.

The front end side of the armature shaft 44 has a worm 45 formed integrally thereon, which is engaged with the teeth 52a of a worm wheel 52. The worm 45 and the worm wheel 52 collectively constitute a speed-reducing mechanism SD, which reduces the speed of rotation of the armature shaft 44 to create a high torque. The created high torque is output to the DR-side wiper arm 21a (see FIG. 1) through an output shaft 22 fixed to the worm wheel 52.

The armature shaft 44 has a commutator 46 disposed on its part closer to the armature 43. The end of the coil is electrically connected to this commutator 46, and a pair of brushes 47 comes in sliding contact with the commutator 46. In this structure, a drive current supplied to each of the brushes 47 flows into the coil via the commutator 46, thus causing the armature 43 to generate an electromagnetic force, which causes the armature shaft 44 to rotate at a given rotating speed in a normal direction or reverse direction.

In the case 51 of the gear unit 50, the worm wheel 52 is housed rotatably and the rotation of the worm 45 is transmitted to the worm wheel 52. The output shaft 22 has its base end side fixed to the worm wheel 52 and its front end side extending out of the case 51. The output shaft 22 is coupled to the base end side of the DR-side wiper arm 21a (see FIG. 1).

A substantially disc-shaped sensor magnet 53 is attached to a front surface 52b of the worm wheel 52, and rotated together with the worm wheel 52 on rotation. The sensor magnet 53 is divided into one half-side and the other half-side along the radial direction, one half-side being magnetized into an N-pole while the other half-side being magnetized into an S-pole. In other words, the sensor magnet 53 is magnetized into the N-pole and the S-pole (two poles) along its circumference at a 180-degree interval.

An opening portion of the case 51 (shown on this side in FIG. 2) is closed with a cover (not shown). On the interior of the cover, the DR-side control board 23 (indicated by a two-dot chain line in FIG. 2) is mounted such that the DR-side control board 23 is counter to the front surface 52b of the worm wheel 52. The DR-side control board 23 is thus housed in the gear unit 50. The DR-side control board 23 controls the motor unit 40, and carries a plurality of electronic components, such as transistors and resistors (not shown), as well as a controller 23a composed of a CPU having a RAM, ROM, etc. The DR-side control board 23 also carries an MR sensor (magnetic resistance element) 23b mounted on a part of DR-side control board 23 which is counter to the sensor magnet 53.

The MR sensor 23b outputs electric signals (indicating variations in a resistance value) of different sizes according to the directions of magnetic flux traversing the MR sensor 23b. An electric signal from the MR sensor 23b, which electric signal is generated by the rotation of the sensor magnet 53 relative to the MR sensor 23b, is sent to the controller 23a. On the basis of the size of the electric signal from the MR sensor 23b, the controller 23a identifies the rotation position, rotating speed, etc., of the worm wheel 52 relative to the case 51, that is, the position, travel speed, etc., of the DR-side wiper blade 21b relative to the windshield 11. The controller 23a is thus able to cause the DR-side wiper member 21 to perform a reverse turn or stop at the storage location SL (see FIG. 1).

The DR-side wiper blade 21b and the AS-side wiper blade 31b are the same in structure as each other. Therefore, the explanation of the structure of the AS-side wiper blade 21b will be omitted, and the structure of the DR-side wiper blade 21b will be explained as a representative structure.

As shown in FIG. 3, the DR-side wiper blade 21b includes a blade holder 60 and a blade rubber 70 held by the blade holder 60. The blade rubber 70 has a lip 71, a body 72, and a neck 73. All parts of the blade rubber 70 are the same in cross-sectional shape as each other in a longitudinal direction thereof.

The lip 71 has a substantially triangular sectional shape and has a tapered front end in contact with the windshield 11. The body 72 has a substantially rectangular sectional shape and has a pair of spring housing slots 72a formed along the longitudinal direction of the blade rubber 70. In the pair of spring housing slots 72a, a pair of vertebras (spring members) 74 are fitted, respectively, each of which is made of an elongated tabular steel. These vertebras 74 are curved in their natural state, in which they are subjected to no external force, such that the vertebras 74 have a radius of curvature smaller than that of the windshield 11. The spring force of the vertebras 74 causes the blade rubber 70 to deform elastically in conformity to the radius of curvature of the windshield 11. This presses the entire part of the lip 71 in its longitudinal direction of the windshield 11, that is, forces the entire part of the lip 71 to stick firmly to the windshield 11.

The lip 71 is connected to the body 72 via the neck 73. The thickness of the neck 73 in the wiping direction (left-hand/right-hand directions in FIG. 3) is the smallest in comparison with the thickness of the other parts of the blade rubber 70. Therefore, the neck 73 can be elastically deformed with ease. As a result, when the lip 71 performs the wiping operation over the windshield 11, the neck 73 is tilted in the wiping direction as the spring force of a tensile spring (not shown) disposed on the base end of the DR-side wiper arm 21a (see FIG. 1) acts on the neck 73 as an extra pressure.

Specifically, when the wiping operation is performed in a direction from the lower reverse-turn position LRP to the upper reverse-turn position URP, as indicated by broken line arrows "forward action" in FIG. 1, the front end side of the lip 71 is kept facing the lower side of the windshield 11, and taking a position shown in FIG. 3 as "stop state B". On the other hand, when the wiping operation is performed in a direction from the upper reverse-turn position URP to the lower reverse-turn position LRP, as indicated by broken line arrows "backward action" in FIG. 1, the front end side of the lip 71 is kept facing the upper side of the windshield 11, and taking a position shown in FIG. 3 as "stop state A".

In this manner, the tilting of the neck 73 causes the lip 71 in its tilted position to come in sliding contact with the windshield. This allows a corner of the lip 71 to certainly wipe rainwater, etc., away from the windshield. The front end side of the lip 71 changes a direction it faces, depending on a wiping direction. This effectively prevents emission of chattering noise during a wiping action.

Then, the operation of the wiper apparatus described above will be described in detail with reference to the drawings. In addition, on behalf of the DR-side wiper motor 20 and the AS-side wiper motor, the operation of the DR-side wiper motor 20 will be described hereinafter.

Before the description of the operation of the wiper apparatus 12, positions to which the DR-side wiper blade 21b can be moved on the windshield 11 will be specified. FIG. 4 diagrammatically shows the windshield 11. Continuous line arrows in FIG. 4 indicate routes through which the DR-side wiper blade 21b can move. Circles (1) to (6) in FIG. 4 indicate the stop positions (storage location) of the DR-side wiper blade 21b (front end side of the lip 71). An area 1 and an area 2 indicated by broken line arrows in FIG. 4 represent a lower-side area and an upper-side area of the windshield 11, respectively, the lower-side and upper-side areas being partitioned by the storage location SL at the midpoint. The area 1 represents the area located on the lower side that cannot be visually recognized from the driver's seat, while the area 2 represents the area located on the upper side that allows the driver in the driver's seat to visually recognize the area relatively easily by looking in.

The DR-side wiper blade 21b stops at two positions: a lower-side stop position (first stop position) APS1 and an upper-side stop position (second stop position) APS2. The lower-side stop position APS1 is provided on the lower side of the windshield (lower side in FIG. 4), and the upper-side stop position APS2 is provided on the upper side of the windshield (upper side in FIG. 4) and is therefore above the lower-side stop position APS1. When the DR-side wiper blade 21b is stopped at the lower-side stop position APS1, the front end side of the lip 71 is put in a position of facing the upper side of the windshield, which is shown in FIG. 3 as "stop state A". When the DR-side wiper blade 21b is stopped at the upper-side stop position APS2, in contrast, the front end side of the lip 71 is put in a position of facing the lower side of the windshield, which is shown in FIG. 3 as "stop state B".

On the further lower side of the windshield which is below the lower-side stop position APS1, a lower limit position for stop EPSL serving as a lower limit position to the stop action of the DR-side wiper blade 21b is provided. On the further upper side of the windshield that is above the upper-side stop position APS2 and below the lower reverse-turn position LRP, an upper limit position for stop EPSU serving as an upper limit position to the stop action of the DR-side wiper blade 21b is provided. When both ignition switch 15 and wiper switch 14 are on, the DR-side wiper blade 21b is caused to reciprocate in wiping action between the lower reverse-turn position LRP and the upper reverse-turn position URP. A lower area of windshield 11 that is below the lower reverse-turn position LRP of FIG. 4 thus represents an area where the DR-side wiper blade 21b can reach when the ignition switch 15 is on but the wiper switch 14 is off.

Movement of the DR-side wiper blade 21b to four positions (APS1, APS2, EPSL, and EPSU) specified on the surface of the windshield 11 is controlled by identifying the position of the DR-side wiper blade 21b on the windshield 11, on the basis of an electric signal from the MR sensor 23b (see FIG. 2) to the controller 23a.

Steps shown in flowcharts of FIGS. 5 and 6 are started by switching on the ignition switch 15 (step S1). At every step shown in FIGS. 5 and 6, the controller 23a (see FIG. 2) makes a "No" or "Yes" judgment and executes a process according to the judgment.

In step S2, the controller 23a judges whether the wiper switch 14 is on. When judging in step S2 that the wiper switch 14 is on (Yes), the controller 23a proceeds to step S3, at which the controller 23a supplies a drive current to the DR-side wiper motor 20 to cause it to perform a reciprocating wiping operation. When judging in step S2 that the wiper switch 14 is off (No), the controller 23a proceeds to step S4, at which the controller 23a keeps the DR-side wiper motor 20 stopped.

In step S5, the controller 23a judges whether the wiper switch 14 is switched off. When judging in step S5 that the wiper switch 14 is switched off (Yes), the controller 23a proceeds to step S6. When judging in step S5 that the wiper switch 14 is on (No), the controller 23a returns to step S3, at which the controller 23a causes the DR-side wiper motor 20 to continue its reciprocating wiping operation. In a loop of steps S3 and S5, the controller 23a causes the DR-side wiper blade 21b to reciprocate in wiping action between the lower reverse-return position LRP and the upper reverse-turn position URP, on the basis of an electric signal from the MR sensor 23b (see FIG. 2).

In step S6, on the basis of a judgment that the wiper switch 14 has been switched off, the controller 23a judges whether the previous stop position of the DR-side wiper blade 21b is the lower-side stop position APS1. The controller 23a extracts information of the past stop positions of the DR-side wiper blade 21b from information stored in the RAM, etc., of the controller 23a. When judging in step S6 that the previous stop position of the DR-side wiper blade 21b is the upper-side stop position APS2 (No), the controller 23a proceeds to step S7, at which the controller 23a causes the DR-side wiper blade 21b to execute a storage action (A) shown in FIG. 4. The storage action (A) executed in steps S7 and S8 is the action of causing the DR-side wiper blade 21b to move down toward the lower side of the windshield 11 beyond the lower reverse-turn position LRP and reach the lower-side stop position APS1.

In step S8, the controller 23a judges whether the DR-side wiper blade 21b has reached the lower-side stop position APS1. When judging in step S8 that the DR-side wiper blade 21b has reached the lower-side stop position APS1 (Yes), the controller 23a proceeds to step S4, at which the controller 23a stops supplying the drive current to the DR-side wiper motor 20 to stop it from running. This causes the DR-side wiper blade 21b to stop at a position indicated by a black circle (1) in FIG. 4, at which the DR-side wiper blade 21b is put in the "stop state A" of FIG. 3 in which a direction the front end side of the lip 71 faces has been changed to a direction different from a direction the front end side of the lip 71 in the "stop state B" faces at the previous stop position. When judging in step S8 that the DR-side wiper blade 21b has not reached the lower-side stop position APS1 yet (No), the controller 23a returns to step S7, at which the controller 23a causes the DR-side wiper blade 21b to keep executing the storage action (A).

When judging in step S6 that the previous stop position of the DR-side wiper blade 21b is the lower-side stop position APS1 (Yes), the controller 23a proceeds to step S9, at which the controller 23a causes the DR-side wiper blade 21b to execute a storage action (B) shown in FIG. 4. The storage action (B) executed in steps S9 to S12 is the action of causing the DR-side wiper blade 21b to move down toward the lower side of the windshield 11 beyond the lower reverse-turn position LRP and temporarily reach the lower limit position for stop EPSL and then causing the DR-side wiper blade 21b to move up toward the upper-side stop position APS2 by rotating the DR-side wiper motor 20 in reverse. This action causes the DR-side wiper blade 21b to travel a relatively long distance from the lower limit position for stop EPSL to the upper-side stop position APS2, thereby certainly changing the direction the front end side of the lip 71 faces, from the direction in the "stop state A" of FIG. 3 to the different direction in the "stop state B" of FIG. 3. Thus, the storage action (B) may also be referred to as "lip turning back operation at stoppage".

In step S10, the controller 23a judges whether the DR-side wiper blade 21b has reached the lower limit position for stop EPSL. When judging in step S10 that the DR-side wiper blade 21b has reached the lower limit position for stop EPSL (Yes), the controller 23a proceeds to step S11, at which the controller 23a rotates the DR-side wiper motor 20 in reverse. This causes the DR-side wiper blade 21b to move up toward the upper-side stop position APS2, that is, to move toward the upper side of the windshield 11 (see FIG. 4). When judging in step S10 that the DR-side wiper blade 21b has not reached the lower limit position for stop EPSL yet (No), the controller 23a returns to step S9, at which the controller 23a causes the DR-side wiper blade 21b to continue the storage action (B).

In step S12, the controller 23a judges whether the DR-side wiper blade 21b has reached the upper-side stop position APS2. When judging in step S12 that the DR-side wiper blade 21b has reached the upper-side stop position APS2 (Yes), the controller 23a proceeds to step S4, at which the controller 23a stops supplying the drive current to the DR-side wiper motor 20 to stop it from running. This causes the DR-side wiper blade 21b to stop at a position indicated by a black circle (2) in FIG. 4, at which the DR-side wiper blade 21b is put in the "stop state B" of FIG. 3 in which the direction the front end side of the lip 71 faces has been changed to the direction different from the direction the front end side of the lip 71 in the "stop state A" faces at the previous stop position. When judging in step S12 that the DR-side wiper blade 21b has not reached the upper-side stop position APS2 yet (No), the controller 23a returns to step S11, at which the controller 23a causes the DR-side wiper blade 21b to continue the storage action (B).

In steps S13 to S24, the controller 23a executes the process of certainly changing the direction the front end side of the lip 71 faces, from the direction in the "stop state A" of FIG. 3 to the different direction in the "stop state B" or vise verse, the process being equivalent to the lip turning back operation, regardless of whether the wiper switch 14 is switched on or off.

In step S13, the controller 23a judges whether the number of vehicle speed input signals from the vehicle speed sensor 16, i.e., the number of times of vehicle speed detections is equal to or more than a prescribed "n" times. When judging in step S13 that the number of times of vehicle speed detections is fewer than the "n" times (No), the controller 23a executes a return process to return to step S2 of FIG. 5. When judging in step S13 that the number of times of vehicle speed detections is equal to or more than the "n" times (Yes), the controller 23a proceeds to step S14, after which the controller 23a executes the lip turning back operation in steps following step S14. In other words, the controller 23a executes the lip turning back operation every time the number of times of vehicle speed detections becomes equal to or more than the "n" times.

According to this embodiment, the number of times of vehicle speed detections is determined to be, for example, 5. This setting avoids a conventional problem that the direction of the front end side of the lip 71 is changed frequently every time the ignition switch is switched on, thus preventing the quick deterioration of the lip 71.

In step S14, the controller 23a judges whether the DR-side wiper blade 21b is currently stopped at the lower-side stop position APS1. When judging in step S14 that the DR-side wiper blade 21b is stopped at the lower-side stop position APS1 (Yes), the controller 23a proceeds to step S15, at which the controller 23a supplies the drive current to the DR-side wiper motor 20 to cause the DR-side wiper blade 21b to move toward the lower limit position for stop EPSL.

At the ensuing step S16, the controller 23a judges whether the DR-side wiper blade 21b has reached the lower limit position for stop EPSL. When judging in step S16 that the DR-side wiper blade 21b has reached the lower limit position for stop EPSL (Yes), the controller 23a proceeds to step S17, at which the controller 23a rotates the DR-side wiper motor 20 in reverse. This causes the DR-side wiper blade 21b to move up toward the upper-side stop position APS2, that is, to move toward the upper side of the windshield 11 (see FIG. 4). When judging in step S16 that the DR-side wiper blade 21b has not reached the lower limit position for stop EPSL yet (No), the controller 23a returns to step S15, at which the controller 23a causes the DR-side wiper blade 21b to keep moving toward the lower limit position for stop EPSL.

In step S18, the controller 23a judges whether the DR-side wiper blade 21b has reached the upper-side stop position APS2. When judging in step S18 that the DR-side wiper blade 21b has reached the upper-side stop position APS2 (Yes), the controller 23a proceeds to step S19, and the controller 23a stops supplying the drive current to the DR-side wiper motor 20 to stop it from running. Hence the DR-side wiper blade 21b has been moved from a position indicated by a white circle (3) in FIG. 4 to a position indicated by a black circle (4) in FIG. 4, that is, has been shifted from the "stop state A" of FIG. 3 to the "stop state B" of FIG. 3, and during this process, the direction of the front end side of the lip 71 has been changed to a different direction. When judging in step S18 that the DR-side wiper blade 21b has not reached the upper-side stop position APS2 yet (No), the controller 23a returns to step S17, at which the controller 23a causes the DR-side wiper blade 21b to keep moving toward the upper-side stop position APS2. Following the process in step S19, the controller 23a executes a return process to return to step S2 of FIG. 5.

When judging in step S14 that the DR-side wiper blade 21b is stopped at the upper-side stop position APS2 (No), the controller 23a proceeds to step S20, at which the controller 23a supplies the drive current to the DR-side wiper motor 20 to cause the DR-side wiper blade 21b to move toward the upper limit position for stop EPSU.

At the ensuing step S21, the controller 23a judges whether the DR-side wiper blade 21b has reached the upper limit position for stop EPSU. When judging in step S21 that the DR-side wiper blade 21b has reached the upper limit position for stop EPSU (Yes), the controller 23a proceeds to step S22, at which the controller 23a rotates the DR-side wiper motor 20 in reverse. This causes the DR-side wiper blade 21b to move down toward the lower-side stop position APS1, that is, to move toward the lower side of the windshield 11 (see FIG. 4). When judging in step S21 that the DR-side wiper blade 21b has not reached the upper limit position for stop EPSU yet (No), the controller 23a returns to step S20, at which the controller 23a causes the DR-side wiper blade 21b to keep moving toward the upper limit position for stop EPSU.

In step S23, the controller 23a judges whether the DR-side wiper blade 21b has reached the lower-side stop position APS1. When judging in step S23 that the DR-side wiper blade 21b has reached the lower-side stop position APS1 (Yes), the controller 23a proceeds to step S24, at which the controller 23a stops supplying the drive current to the DR-side wiper motor 20 to stop it from running. Hence the DR-side wiper blade 21b has been moved from a position indicated by a white circle (4) in FIG. 4 to a position indicated by a black circle (6) in FIG. 4, that is, has been shifted from the "stop state B" of FIG. 3 to the "stop state A" of FIG. 3, and during this process, the direction of the front end side of the lip 71 has been changed to a different direction. When judging in step S23 that the DR-side wiper blade 21b has not reached the lower-side stop position APS1 yet (No), the controller 23a returns to step S22, at which the controller 23a causes the DR-side wiper blade 21b to keep moving toward the lower-side stop position APS1. Following the process in step S24, the controller 23a executes a return process to return to step S2 of FIG. 5.

In this manner, when the lip turning back operation is executed according to the number of vehicle speed input signals from the vehicle speed sensor 16, i.e., the number of times of vehicle speed detections, the DR-side wiper blade 21b is not caused to move directly to and away from the lower-side stop position APS1 and upper-side stop position APS2 between the lower-side stop position APS1 and upper-side stop position APS2 but is caused to move temporarily to the lower limit position for stop EPSL or the upper limit position for stop EPSU. This process increases the amount of travel of the DR-side wiper blade 21b (blade rubber 70), thereby certainly changing the direction the front end side of the lip 71 faces to a different direction. During this process, the lip 71 performs the turning back operation in the area 1 and in a subarea within the area 2 which is closer to the lower side of the windshield 11 than the lower reverse-turn position LRP. The turning back operation is thus hardly noticeable to the driver and occupant, and therefore does not give them a concern that the wiper apparatus 12 might be functioning improperly.

As described above, according to the wiper apparatus 12 of the first embodiment, when the number of times of vehicle speed detections reaches the prescribed "n" times, the DR-side wiper blade 21b is moved in such a way that when the front end side of the lip 71 reaches the lower-side stop position APS1, the DR-side wiper blade 21b is moved temporarily to the lower limit position for stop EPSL, then moved to the upper-side stop position APS2 and stopped there, and that when the front end side of the lip 71 reaches the upper-side stop position APS2, the DR-side wiper blade 21b is moved temporarily to the upper limit position for stop EPSU, then moved to the lower-side stop position APS1 and stopped there.

This process prevents a problem caused by a bending propensity developing at the lip 71 or the neck 73, such as a stop position shifted from the correct stop position, and eliminates the need of frequently changing the direction the front end side of the lip 71 faces every time the ignition switch 15 is switched on or off.

According to the present invention, the amount of travel of the DR-side wiper blade 21b is increased as the DR-side wiper blade 21b is caused to stop at the lower-side stop position APS1 as well as at the upper-side stop position APS2. At each stop position (APS1 and APS2), the direction the front end side of the lip 71 faces is certainly changed.

Next, the second embodiment of the present invention will be described hereinafter in detail with reference to the drawings. In addition, parts the same in function as those of the first embodiment will be denoted by the same reference number and omitted in further description.

Figure 7:
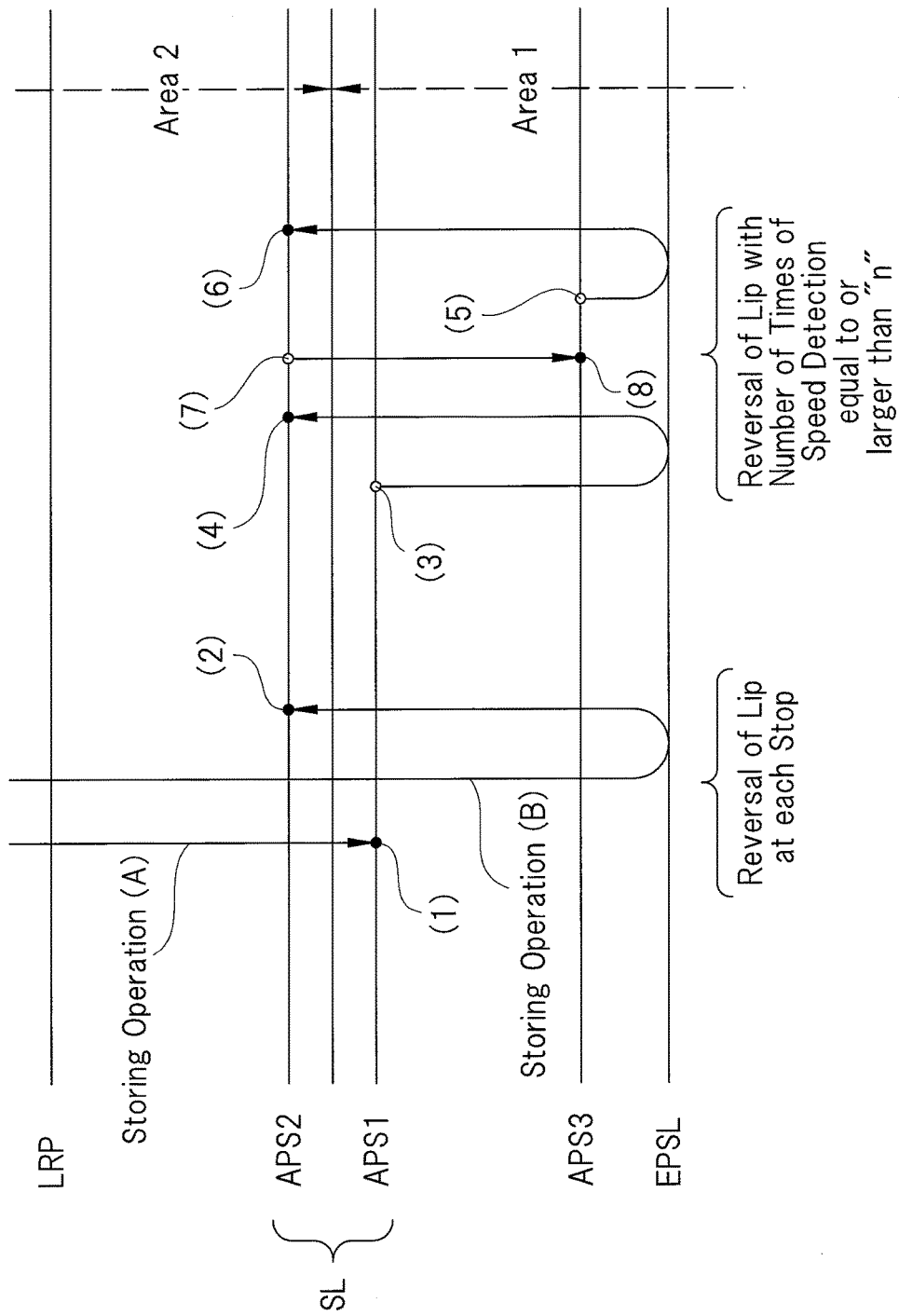
FIG. 7 is a diagram explaining a lip turning back operation in the second embodiment.
Figure 8:
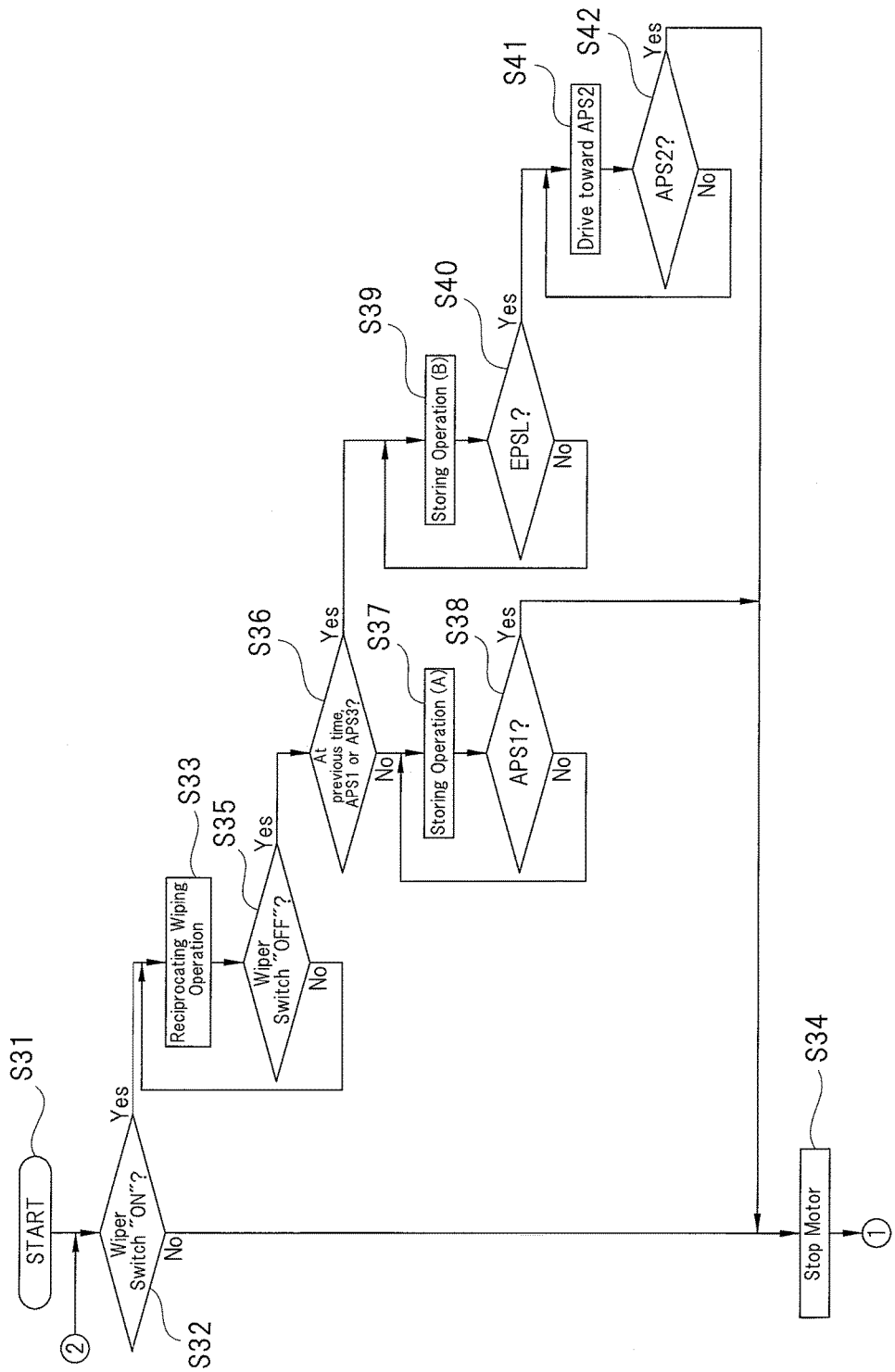
FIG. 8 is a flow chart explaining the lip turning back operation shown in FIG. 7 (in each stop state of the wiper blade)
Figure 9:
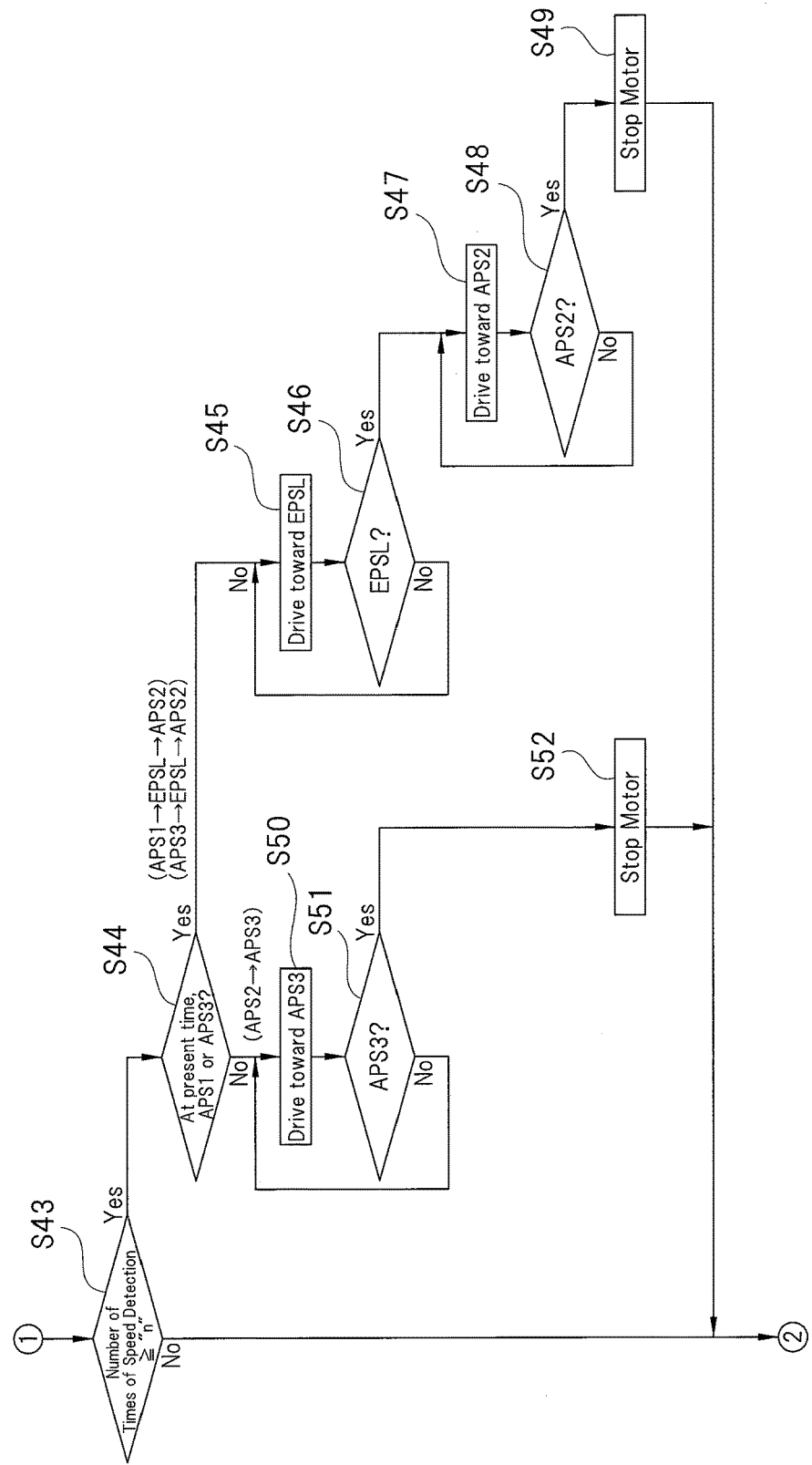
FIG. 9 is a flow chart explaining the lip turning back operation shown in FIG. 7 (the number of times of speed detection)

FIG. 7 is a diagram explaining a lip turning back operation in the second embodiment, FIG. 8 is a flow chart explaining the lip turning back operation shown in FIG. 7 (in each stop state of the wiper blade), and FIG. 9 is a flow chart explaining the lip turning back operation shown in FIG. 7 (the number of times of speed detection).

As shown in FIG. 7, according to the second embodiment, positions to which the DR-side wiper blade 21b can move, and which are specified on the surface of the windshield 11, are different from the positions specified in the first embodiment. Specifically, a second lower-side stop position (third stop position) APS3 is specified in place of the upper limit position for stop EPSU (see FIG. 4) of the first embodiment. Since the second lower-side stop position APS3 is specified, the lower-side stop position APS1 is specified as a first lower-side stop position in the second embodiment.

The second lower-side stop position APS3 is located closer to the lower limit position for stop EPSL in the area between the first lower-side stop position APS1 and the lower limit position for stop EPSL. The amount of travel between the first lower-side stop position APS1 and the second lower-side stop position APS3 is thus determined to be relatively large. The DR-side wiper blade 21b stopped at the second lower-side stop position APS3 is in the "stop state A" of FIG. 3 in which the front end side of the lip 71 faces the upper side of the windshield.

Steps shown in flowcharts of FIGS. 8 and 9 are started by switching on the ignition switch 15 (step S31). In step S32, the controller 23a judges whether the wiper switch 14 is on. When judging in step S32 that the wiper switch 14 is on (Yes), the controller 23a proceeds to step S33, at which the controller 23a supplies a drive current to the DR-side wiper motor 20 to cause it to perform a reciprocating wiping operation. When judging in step S32 that the wiper switch 14 is off (No), the controller 23a proceeds to step S34, at which the controller 23a keeps the DR-side wiper motor 20 stopped.

In step S35, the controller 23a judges whether the wiper switch 14 is switched off. When judging in step S35 that the wiper switch 14 is switched off (Yes), the controller 23a proceeds to step S36. When judging in step S35 that the wiper switch 14 is on (No), the controller 23a returns to step S33, at which the controller 23a causes the DR-side wiper motor 20 to continue its reciprocating wiping operation.

In step S36, on the basis of a judgment that the wiper switch 14 has been switched off, the controller 23a judges whether the previous stop position of the DR-side wiper blade 21b (tip side of the lip 71) is the first lower-side stop position APS1 or the second lower-side stop position APS3. When judging in step S36 that the previous stop position of the DR-side wiper blade 21b is the upper-side stop position APS2 (No), the controller 23a proceeds to step S37, at which the controller 23a causes the DR-side wiper blade 21b to execute a storage action (A) shown in FIG. 7.

In step S38, the controller 23a judges whether the DR-side wiper blade 21b has reached the first lower-side stop position APS1. When judging in step S38 that the DR-side wiper blade 21b has reached the first lower-side stop position APS1 (Yes), the controller 23a proceeds to step S34, at which the controller 23a stops supplying the drive current to the DR-side wiper motor 20 to stop it from running. This causes the DR-side wiper blade 21b to stop at a position indicated by a black circle (1) in FIG. 7, at which the DR-side wiper blade 21b is put in the "stop state A" of FIG. 3 in which a direction the front end side of the lip 71 faces has been changed to a direction different from a direction the front end side of the lip 71 in the "stop state B" faces at the previous stop position. When judging in step S38 that the DR-side wiper blade 21b has not reached the first lower-side stop position APS1 yet (No), the controller 23a returns to step S7, at which the controller 23a causes the DR-side wiper blade 21b to keep executing the storage action (A).

When judging in step S36 that the previous stop position of the DR-side wiper blade 21b is the first lower-side stop position APS1 or the second lower-side stop position APS3 (Yes), the controller 23a proceeds to step S39, at which the controller 23a causes the DR-side wiper blade 21b to execute a storage action (B) shown in FIG. 7.

In step S40, the controller 23a judges whether the DR-side wiper blade 21b has reached the lower limit position for stop EPSL. When judging in step S40 that the DR-side wiper blade 21b has reached the lower limit position for stop EPSL (Yes), the controller 23a proceeds to step S41, at which the controller 23a rotates the DR-side wiper motor 20 in reverse. This causes the DR-side wiper blade 21b to move up toward the upper-side stop position APS2, that is, to move toward the upper side of the windshield 11 (see FIG. 7). On the other hand, when judging in step S40 that the DR-side wiper blade 21b has not reached the lower limit position for stop EPSL yet (No), the controller 23a returns to step S39, at which the controller 23a causes the DR-side wiper blade 21b to continue the storage action (B).

In step S42, the controller 23a judges whether the DR-side wiper blade 21b has reached the upper-side stop position APS2. When judging in step S42 that the DR-side wiper blade 21b has reached the upper-side stop position APS2 (Yes), the controller 23a proceeds to step S34, at which the controller 23a stops supplying the drive current to the DR-side wiper motor 20 to stop it from running. This causes the DR-side wiper blade 21b to stop at a position indicated by a black circle (2) in FIG. 7, at which the DR-side wiper blade 21b is put in the "stop state B" of FIG. 3 in which the direction the front end side of the lip 71 faces has been changed to the direction different from the direction the front end side of the lip 71 in the "stop state A" faces at the previous stop position. When judging in step S42 that the DR-side wiper blade 21b has not reached the upper-side stop position APS2 yet (No), the controller 23a returns to step S41, at which the controller 23a causes the DR-side wiper blade 21b to continue the storage action (B).

In step S43, the controller 23a judges whether the number of vehicle speed input signals from the vehicle speed sensor 16, i.e., the number of times of vehicle speed detections is equal to or more than a prescribed "n" times. When judging in step S43 that the number of times of vehicle speed detections is fewer than the "n" times (No), the controller 23a executes a return process to return to step S32 of FIG. 8. On the other hand, when judging in step S43 that the number of times of vehicle speed detections is equal to or more than the "n" times (Yes), the controller 23a proceeds to step S44, after which the controller 23a executes the lip turning back operation in steps following step S44.

In step S44, the controller 23a judges whether the DR-side wiper blade 21b is currently stopped at the first lower-side stop position APS1 or the second lower-side stop position APS3. When judging in step S44 that the DR-side wiper blade 21b is stopped at the first lower-side stop position APS1 or the second lower-side stop position APS3 (Yes), the controller 23a proceeds to step S45, at which the controller 23a supplies the drive current to the DR-side wiper motor 20 to cause the DR-side wiper blade 21b to move toward the lower limit position for stop EPSL.

At the ensuing step S46, the controller 23a judges whether the DR-side wiper blade 21b has reached the lower limit position for stop EPSL. When judging in step S46 that the DR-side wiper blade 21b has reached the lower limit position for stop EPSL (Yes), the controller 23a proceeds to step S47, at which the controller 23a rotates the DR-side wiper motor 20 in reverse. This causes the DR-side wiper blade 21b to move up toward the upper-side stop position APS2, that is, to move toward the upper side of the windshield 11 (see FIG. 7). When judging in step S46 that the DR-side wiper blade 21b has not reached the lower limit position for stop EPSL yet (No), the controller 23a returns to step S45, at which the controller 23a causes the DR-side wiper blade 21b to keep moving toward the lower limit position for stop EPSL.

In step S48, the controller 23a judges whether the DR-side wiper blade 21b has reached the upper-side stop position APS2. When judging in step S48 that the DR-side wiper blade 21b has reached the upper-side stop position APS2 (Yes), the controller 23a proceeds to step S49, and the controller 23a stops supplying the drive current to the DR-side wiper motor 20 to stop it from running.

In this manner, when the judgment made in step S44 indicates that the DR-side wiper blade 21b is at the first lower-side stop position APS1, the DR-side wiper blade 21b moves from a position indicated by a white circle (3) in FIG. 7 to a position indicated by a black circle (4) in FIG. 7, that is, shifts from the "stop state A" of FIG. 3 to the "stop state B" of FIG. 3, and during this process, the direction of the front end side of the lip 71 changes to a different direction. When the judgment made in step S44 indicates that the DR-side wiper blade 21b is at the second lower-side stop position APS3, the DR-side wiper blade 21b moves from a position indicated by a white circle (5) in FIG. 7 to a position indicated by a black circle (6) in FIG. 7, that is, shifts from the "stop state A" of FIG. 3 to the "stop state B" of FIG. 3, and during this process, the direction of the front end side of the lip 71 changes to a different direction.

When judging in step S48 that the DR-side wiper blade 21b has not reached the upper-side stop position APS2 yet (No), the controller 23a returns to step S47, at which the controller 23a causes the DR-side wiper blade 21b to keep moving toward the upper-side stop position APS2. Following the process in step S49, the controller 23a executes a return process to return to step S32 of FIG. 8.

When judging in step S44 that the DR-side wiper blade 21b is at the upper-side stop position APS2 (No), the controller 23a proceeds to step S50, at which the controller 23a supplies the drive current to the DR-side wiper motor 20 to cause the DR-side wiper blade 21b to move toward the second lower-side stop position APS3.

At the ensuing step S51, the controller 23a judges whether the DR-side wiper blade 21b has reached the second lower-side stop position APS3. When judging in step S51 that the DR-side wiper blade 21b has reached the second lower-side stop position APS3 (Yes), the controller 23a proceeds to step S52, at which the controller 23a stops supplying the drive current to the DR-side wiper motor 20 to stop it from running. Hence the DR-side wiper blade 21b has been moved from a position indicated by a white circle (7) in FIG. 7 to a position indicated by a black circle (8) in FIG. 7, that is, has been shifted from the "stop state B" of FIG. 3 to the "stop state A" of FIG. 3, and during this process, the direction of the front end side of the lip 71 has been changed to a different direction.

The travel distance between the upper-side stop position APS2 and the second lower-side stop position APS3 is determined to be a sufficient travel distance. Therefore, the direction the front end side of the lip 71 faces can be changed to a different direction without adding an extra travel distance by, for example, rotating the DR-side wiper motor 20 in reverse.

When judging in step S51 that the DR-side wiper blade 21b has not reached the second lower-side stop position APS3 yet (No), the controller 23a returns to step 50, at which the controller 23a causes the DR-side wiper blade 21b to keep moving toward the second lower-side stop position APS3. Following the process in step S52, the controller 23a executes a return process to return to step S32 of FIG. 8.

The second embodiment constructed and carried out in the above manner offers the same effects as those of the first embodiment. In addition, according to the second embodiment, lip turning back operations is executed only in the area 1. This makes the lip turning back operations more unnoticeable to the driver and occupant.

Next, the third embodiment of the present invention will be described hereinafter in detail with reference to the drawings. In addition, parts the same in function as those of the first embodiment will be denoted by the same reference number and omitted in further description.

Figure 10:
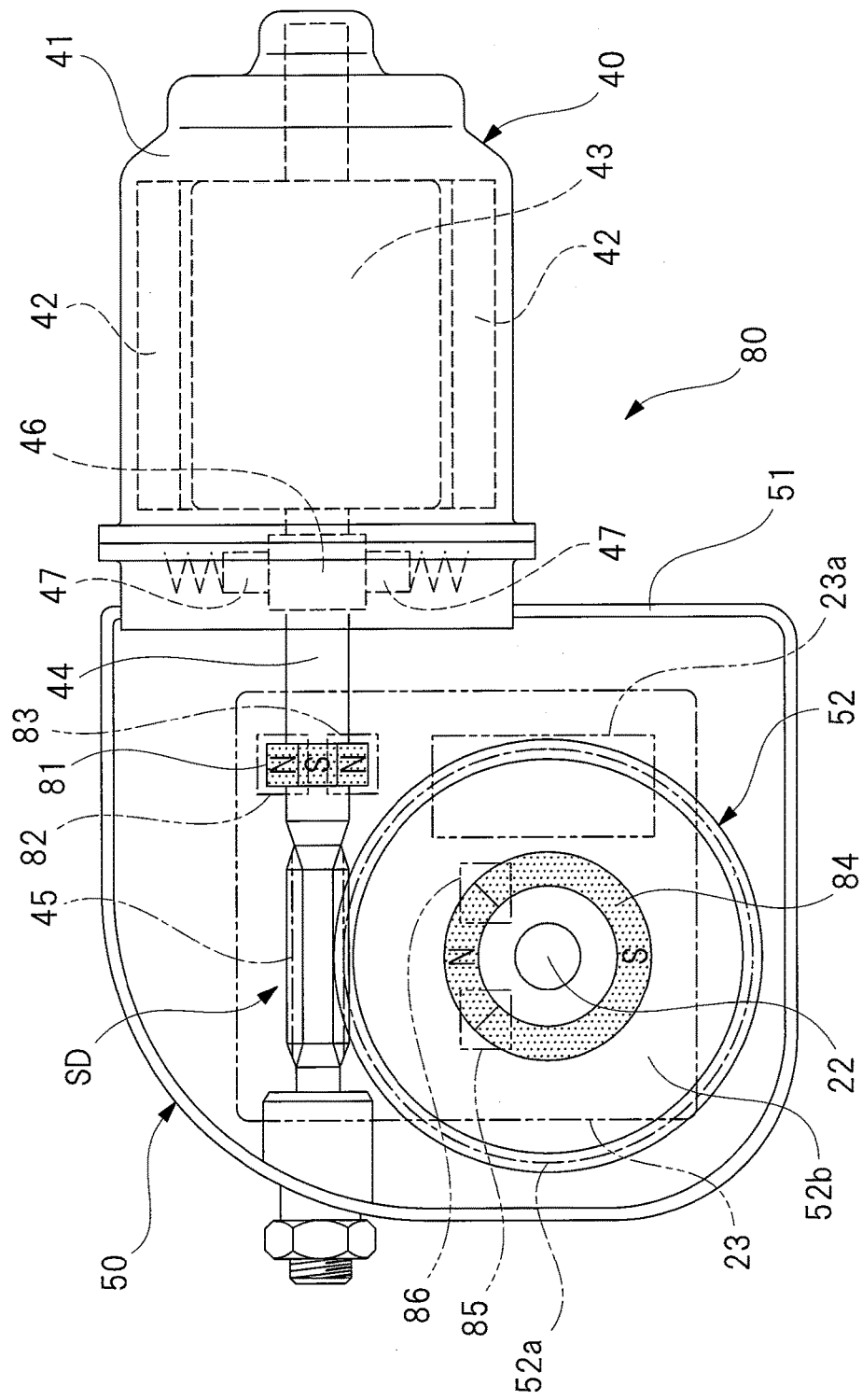
FIG. 10 is a view showing details of a wiper motor in the third embodiment.

FIG. 10 is a view showing details of a wiper motor in the third embodiment.

In the DR-side wiper motor 20 according to the first embodiment of FIG. 2, the worm wheel 52 is fitted with the substantially disc-shaped sensor magnet 53, and one MR sensor 23b is mounted on the DR-side control board 23 such that the MR sensor 23b is counter to the sensor magnet 53.

In a DR-side wiper motor 80 according to the third embodiment, a ringed multi-pole magnet 81 is disposed between the worm 45 of the armature shaft 44 and the commutator 46, and a pair of rotation detecting Hall sensors 82 and 83 are mounted on the DR-side control board 23 such that they are counter to the multi-pole magnet 81. The worm wheel 52 is fitted with a ringed sensor magnet 84, and a pair of absolute position detecting Hall sensors 85 and 86 are mounted on the DR-side control board 23 such that the Hall sensors 85 and 86 are counted to the sensor magnet 84.

The multi-pole magnet 81 is constructed by giving the magnet N-poles and S-poles (e.g., 6 poles) at intervals through alternate magnetization along the circumferential direction. The multi-pole magnet 81, together with the pair of rotation detecting Hall sensors 82 and 83, is used to detect the number, directions, etc., of rotations of the armature shaft 44. The rotation detecting Hall sensors 82 and 83 are arranged close to the multi-pole magnet 81 to achieve sufficient detection accuracy. As the multi-pole magnet 81 rotates, the rotation detecting Hall sensors 82 and 83 each generate electric signals (pulse signals) of square waves, sending them to the controller 23a. By recording times at which pulse signals have appeared and counting appeared pulse signals, the controller 23a comes to know the rotation status, such as the number of rotations and directions of rotations, of the armature shaft 44, and controls the motor unit 40, on the basis of the rotation status.

The sensor magnet 84 has one circumferential fan portion with the center angle of about 90 degree magnetized into an N-pole and the other circumferential fan portion with the center angle of about 270 degrees magnetized into an S-pole. This sensor magnet 84, together with the pair of absolute position detecting Hall sensors 85 and 86, is used to detect the rotation status of the output shaft 22. The absolute position detecting Hall sensors 85 and 86 are arranged close to the sensor magnet 84 to achieve sufficient detection accuracy. As the sensor magnet 84 rotates, the absolute position detecting Hall sensors 85 and 86 each generate electric signals (pulse signals) of square waves, sending them to the controller 23a. By recording times at which pulse signals have appeared and counting appeared pulse signals, the controller 23a comes to know the rotation status of the output shaft 22, that is, acquires information of the position of the DR-side wiper member 21 (FIG. 1) relative to the windshield 11, and controls the motor unit 40, on the basis of the acquired position information.

The third embodiment described above has the same advantageous effects as those of the first embodiment. In addition, in the third embodiment, it is possible to accurately control the motor unit 40, thus allowing more accurate lip turning back operations.

Next, the fourth embodiment of the present invention will be described hereinafter in detail with reference to the drawings. In addition, parts the same in function as those of the first embodiment will be denoted by the same reference number and omitted in further description.

Figure 11:
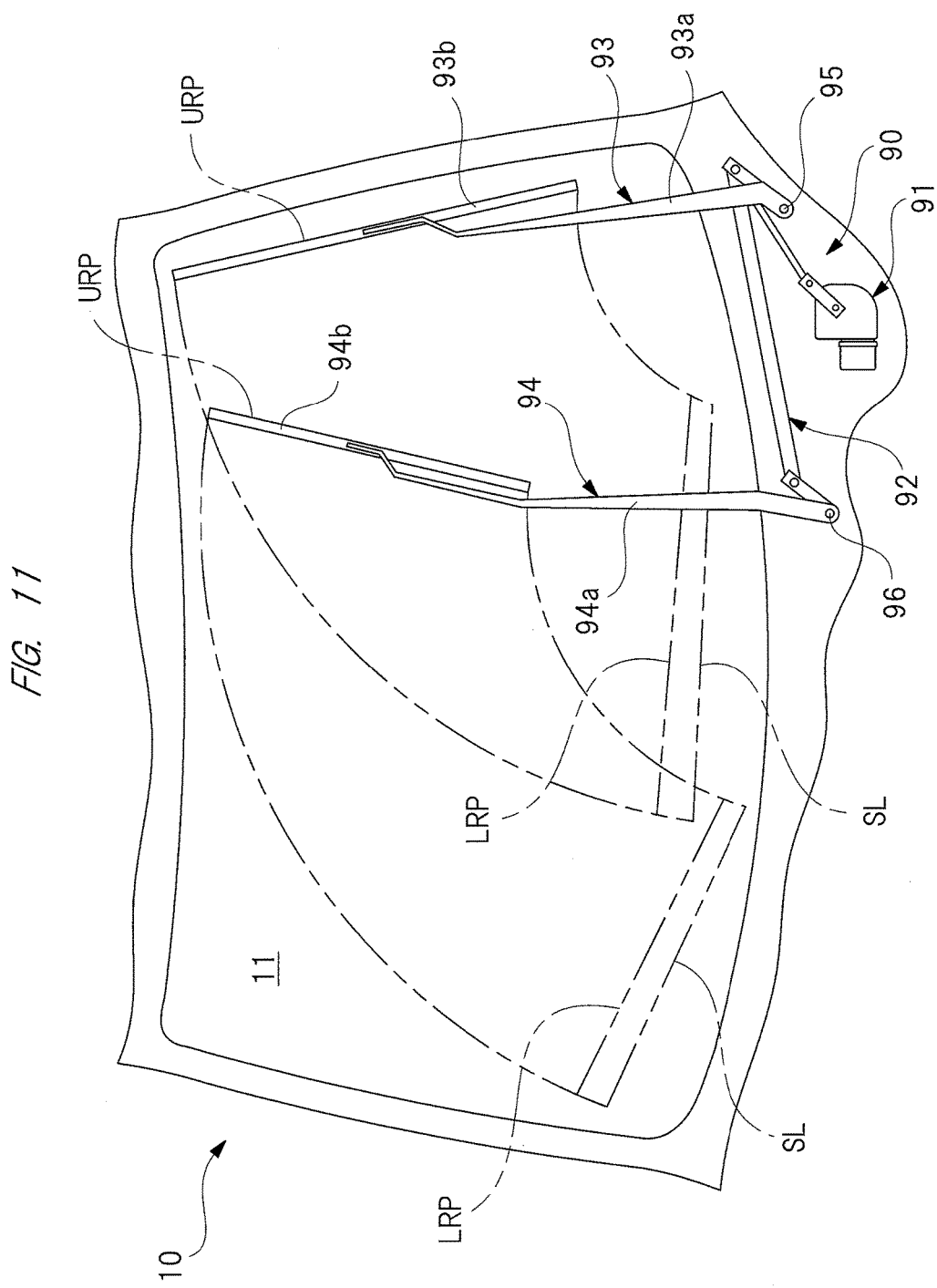
FIG. 11 is a view showing a wiper apparatus in the fourth embodiment.

FIG. 11 is a view showing a wiper apparatus in the fourth embodiment.

As shown in FIG. 11, while the first embodiment provides the wiper apparatus 12 (see FIG. 1) as the symmetrical-type direct-drive wiper apparatus, the fourth embodiment provides a tandem-type wiper apparatus 90. According to this tandem-type wiper apparatus 90, one wiper motor 91 drives a power transmission mechanism 92, thereby causing a DR-side wiper member 93 and an AS-side wiper member 94 to oscillate on the windshield 11 of the vehicle 10.

The wiper apparatus 90 includes the wiper motor 91 identical in structure with the DR-side wiper motor 20 (see FIG. 2) of the first embodiment. The power transmission mechanism 92 transmits the oscillating motion of the wiper motor 91 to a DR-side pivot 95 and an AS-side pivot 96. To the DR-side pivot 95 and the AS-side pivot 96, respective base ends of the DR-side wiper member 93 and the AS-side wiper member 94 are fixed. The oscillating motions of the pivots 95 and 96 cause respective front end sides of the wiper members 93 and 94 to oscillate on the windshield 11.

The wiper member 93 is composed of a wiper arm 93a and a wiper blade 93b fitted thereto, while the wiper member 94 is composed of a wiper arm 94a and a wiper blade 94b fitted thereto.

The rotation of the wiper motor 91 transmits the oscillating motion of the wiper motor 91 to the pivots 95 and 96 via the power transmission mechanism 92, thereby causing the pivots 95 and 96 to oscillate. In this manner, the driving force of the wiper motor 91 is transmitted to the wiper members 93 and 94. As a result, the wiper blades 93a and 94b wipe rainwater, etc., away from the surface of the windshield 11.

The fourth embodiment explained in the above has advantageous effects the same as those of the first embodiment. Since only one wiper motor 91 needs to be controlled in the fourth embodiment, a control logic used for the fourth embodiment becomes simpler than that used for the first embodiment.

The present invention is not limited to the above embodiments but may obviously be modified into various applications on the condition that the modification does not deviate from the substance of the invention. For example, the above embodiments are described as examples in which the present invention is applied to the wiper apparatuses 12 and 90 that wipe the windshield 11 of the vehicle 10. In addition, the present invention is applied not only to the wiper apparatuses 12 and 90 but may also be applied to a wiper apparatus that wipes the rear window of the vehicle 10.

The wiper apparatus is incorporated in a vehicle such as automotive vehicle, and is used to wipe rainwater, dust, etc., away from the windshield to offer a clear field of view.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A wiper apparatus which changes a direction of a front end side of a lip of a wiper blade on the basis of each stop of the wiper blade, wherein
    the lip comes in sliding contact with a windshield on which positions are specified, the specified positions including:
    a first stop position at which the wiper blade is stopped with the front end side of the lip put in a position of facing an upper side of the windshield;
    a second stop position at which the wiper blade is stopped with the front end side of the lip put in a position of facing a lower side of the windshield;
    a lower limit position for stop serving as a lower limit position to a stop action of the wiper blade; and
    an upper limit position for stop serving as an upper limit position to a stop action of the wiper blade, and wherein
    when a number of times of vehicle speed detections reaches a prescribed times, the wiper blade is moved in such a way that when the front end side of the lip reaches the first stop position, the wiper blade is moved temporarily to the lower limit position for stop, then moved to the second stop position and then stopped, and in such a way that when the front end side of the lip reaches the second stop position, the wiper blade is moved temporarily to the upper limit position for stop, then moved to the first stop position and stopped there.

2. The wiper apparatus according to claim 1, wherein
    the first stop position is provided on a lower side of the windshield, wherein
    the second stop position is provided on an upper side of the windshield and is above the first stop position,
    the lower limit position for stop is provided on a further lower side of the windshield, the further lower side being below the first stop position, and
    the upper limit position for stop is provided on a further upper side of the windshield, the further upper side being above the second stop position.

3. A wiper apparatus which change a direction of a front end side of a lip of a wiper blade on the basis of each stop of the wiper blade, wherein
    the lip comes in sliding contact with a windshield on which positions are specified, the specified positions including:
    a first stop position at which the wiper blade is stopped with the front end side of the lip put in a position of facing an upper side of the windshield;
    a second stop position at which the wiper blade is stopped with the front end side of the lip put in a position of facing a lower side of the windshield;
    a lower limit position for stop provided on a further lower side of the windshield to be below the first stop position, the lower limit position for stop serving as a lower limit position to a stop action of the wiper blade; and
    a third stop position provided between the first stop position and the lower limit position for stop, the third stop position being a position at which the wiper blade is stopped with the front end side of the lip put in a position of facing the upper side of the windshield, wherein
    when a number of times of vehicle speed detections reaches a prescribed times, the wiper blade is moved in such a way that when the front end side of the lip reaches the first stop position or third stop position, the wiper blade is moved temporarily to the lower limit position for stop, then moved to the second stop position, and then stopped there, and in such a way that when the front end side of the lip reaches the second stop position, the wiper blade is moved to the third stop position and stopped there.

4. The wiper apparatus according to claim 3, wherein
    the first stop position is provided on a lower side of the windshield, and
    the second stop position is provided on an upper side of the windshield and is above the first stop position on the windshield.

* * * * *